United States Patent [19]
Schultz

[11] Patent Number: 5,941,074
[45] Date of Patent: Aug. 24, 1999

[54] MULTI-PORT PROPORTIONAL FUEL CONTROL VALVE FOR GAS TURBINE ENGINE

[75] Inventor: Matthew S. Schultz, Sarasota, Fla.

[73] Assignee: Dana Corporation, Toledo, Ohio

[21] Appl. No.: 08/899,051

[22] Filed: Jul. 23, 1997

Related U.S. Application Data

[63] Continuation-in-part of application No. 08/557,301, Nov. 14, 1995, Pat. No. 5,694,967.

[51] Int. Cl.⁶ ............................................. F02C 7/228
[52] U.S. Cl. ................................. 60/734; 137/118.02
[58] Field of Search ......................... 60/734, 739, 740, 60/741; 137/118.02

[56] References Cited

U.S. PATENT DOCUMENTS

| | | |
|---|---|---|
| 2,653,003 | 9/1953 | Overbeke . |
| 2,664,910 | 1/1954 | Boyd et al. . |
| 2,692,797 | 10/1954 | Wood et al. . |
| 2,700,394 | 1/1955 | Jay . |
| 2,731,976 | 1/1956 | Orent et al. . |
| 2,762,426 | 9/1956 | Wood et al. . |
| 2,782,739 | 2/1957 | Freer . |
| 2,786,482 | 3/1957 | Bayer . |
| 2,821,992 | 2/1958 | Richards et al. . |
| 2,832,368 | 4/1958 | Freer . |
| 2,845,079 | 7/1958 | Hutton . |
| 2,845,939 | 8/1958 | Bayer . |
| 3,080,885 | 3/1963 | Webster et al. . |
| 3,412,746 | 11/1968 | Latta . |
| 3,899,879 | 8/1975 | Downing . |
| 4,164,962 | 8/1979 | Soderberg . |
| 4,226,365 | 10/1980 | Norris et al. . |
| 4,546,796 | 10/1985 | Bourquin . |
| 4,590,768 | 5/1986 | Halvorsen et al. . |
| 4,614,202 | 9/1986 | Halvorsen et al. . |
| 5,003,771 | 4/1991 | Kester et al. . |
| 5,339,636 | 8/1994 | Donnelly et al. ...................... 60/734 |
| 5,442,922 | 8/1995 | Dyer et al. ............................ 60/739 |

*Primary Examiner*—Louis J. Casaregola
*Attorney, Agent, or Firm*—Millen, White, Zelano & Branigan, P.C.

[57] ABSTRACT

A variable flow control valve for multiport injection of pressurized liquid through an array of injection nozzles for a gas turbine engine is connected by nozzle ports to the engine. The valve includes a slidable valve element which progressively opens and closes a plurality of first ports by sliding triangular apertures thereover. A plurality of second ports communicate with a chamber containing the slidable valve element, the second ports also communicating with individual compensators that are in communication with the first ports and nozzle ports. The compensators connect the first ports to the nozzle ports through variable flow valves which are biased to the fully open opposition against the pressure of liquid in the second ports. By so configuring the flow control valves, pressure in the chamber compensates for pressure surges in the pressurized liquid by reducing flow through the variable flow valves in response to pressure increases in the pressurized fluid.

9 Claims, 3 Drawing Sheets

MULTI-PORT PROPORTIONAL FUEL CONTROL VALVE FOR GAS TURBINE ENGINE

CROSS-REFERENCE TO RELATED APPLICATION

This application is a continuation-in-part application of U.S. patent application Ser. No. 08/557,301, filed Nov. 14, 1995 (U.S. Pat. No. 5,694,967).

FIELD OF THE INVENTION

The present invention is directed to multi-port proportional flow control valves for turbine engines. More particularly, the present invention is directed to multi-port flow control valves which modulate the flow of injection liquid in gas turbine engines and distributes the liquid among a multitude of injection nozzles.

BACKGROUND ART

Gas turbine engines are defined as axial flow, rotary machines which utilize an annular combustion chamber. Gas turbines are used for a number of purposes, including powering aircraft, electric generators and pumps for oil and gas lines. Typically, a plurality of nozzles are disposed in the combustion chambers of gas turbines for spraying fuel into a stream of air passing through the chambers. The fuel is ignited and burned with oxygen to add energy to the stream of air.

The fuel system of a gas turbine includes a source of pressurized fuel, an array of fuel injection nozzles and a fuel control valve. The fuel control valve responds to power settings of the engine and adjusts the flow rate of fuel through an array of ports to the nozzles accordingly. The ports in the fuel control valve extend through the casing of the valve and are controlled by a valve element which progressively either uncovers or covers the ports to increase and decrease the flow of fuel to the engine. Each port in the valve has the same flow area for a given location of the piston so as to distribute fuel in equal amounts to the fuel nozzles in the combustion chamber. This provides uniform combustion within the combustion chamber and avoids the occurrence localized high temperature regions in the chamber.

Maintaining equality of flow distribution among a multitude of turbine injection nozzles is a constant concern, as is the need to eliminate valve-generated contamination of fuel or other injection liquids (such as water). Since low lubricity injection systems are more likely to encounter problems in flow distribution, equality of flow among of the injection nozzles of such systems is a serious concern.

BRIEF SUMMARY OF THE INVENTION

It is a feature of the present invention to provide a new and improved flow control valve for multiport injection systems useful for distributing pressurized fuel or other liquids, such as water, to combustion chambers of internal combustion engines, such as a gas turbine engines.

Upon further study of the specification and appended claims, further features and advantages of this invention will become apparent to those skilled in the art.

In view of this feature and other features, the present invention is utilized in a flow control valve for multiport injection of pressurized liquid through an array of injection nozzles connected by nozzle ports to the flow control valve. The valve includes a slidable valve element in communication with a common inlet in a chamber having a plurality of axially positioned first ports wherein each of the ports is connected to an outlet port which, in turn, is connected to one of the liquid injection nozzles. In accordance with the present invention, the improvement in the aforedescribed flow control valve includes a plurality of shaped inlet openings in the chamber which are aligned with the first ports. A plurality of second ports communicate with a space behind the slidable valve element. The first and second ports are in communication with individual compensators with each of the first ports being connected through the compensators to their respective nozzle ports and with the second ports applying countervailing pressure to variable flow valves within the compensators. By so configuring, the flow control valve, pressure in the space behind the slidable valve member compensates for pressure surges in the pressurized liquid by reducing flow through the variable flow valve in response to pressure increases in the pressurized fluid.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
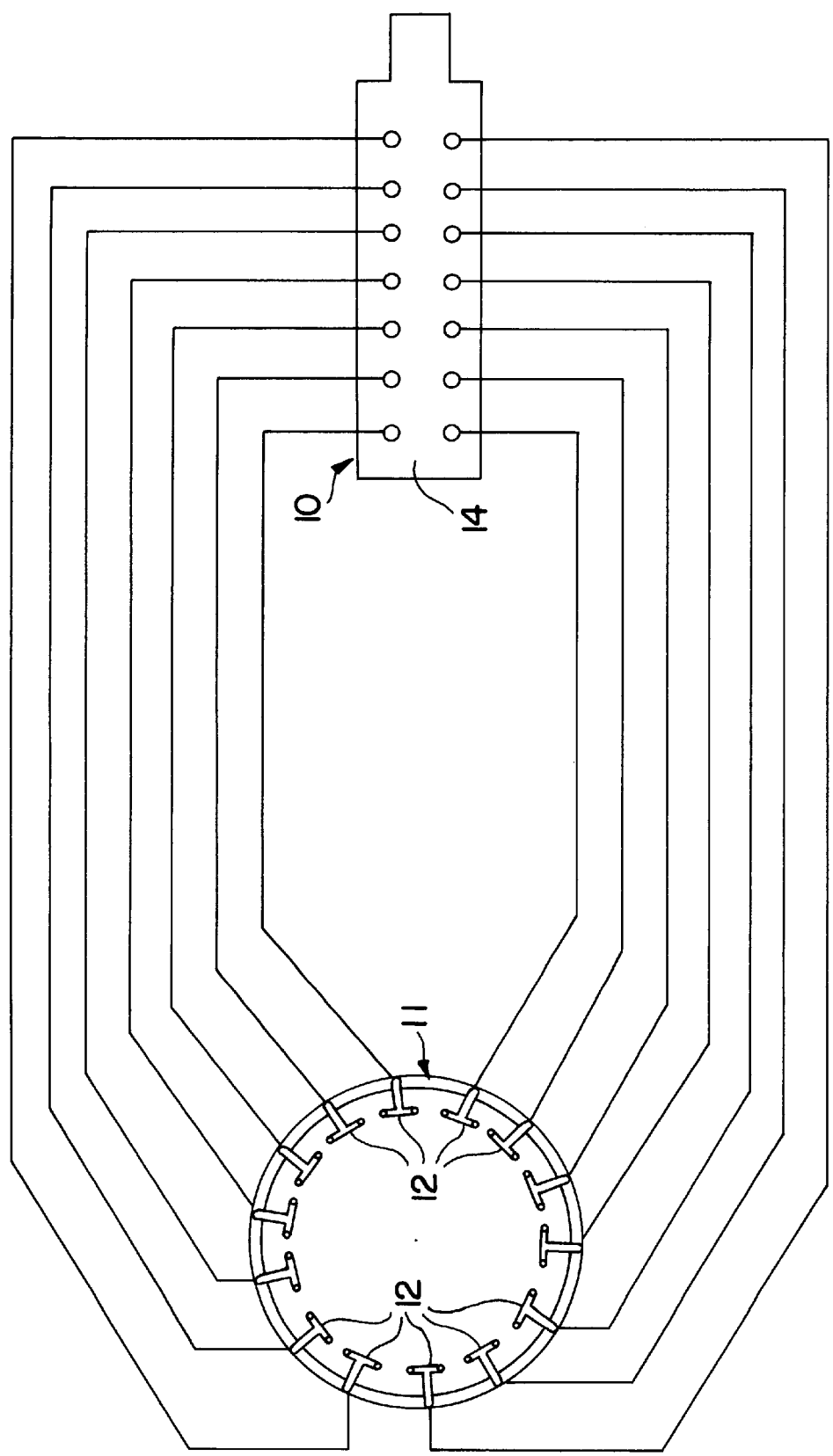
FIG. 1 is a schematic view of the system employing the invention showing a multiport valve connected to a plurality of fuel nozzles.

Referring now to FIG. 1, there is shown a multi-port fuel control valve 10 for use with an internal combustion engine 11 (such as a gas turbine engine) having a plurality of fuel dispensing nozzles 12 which dispense fuel to the combustion chamber or chambers of the engine. The number of nozzles 12 depends on the engine. In the illustrated embodiment, 14 nozzles are shown, but the number could be, for example, 8, 10, 18 or any other reasonable number.

Referring now to FIGS. 2–5, the multi-port valve 10 is comprised of a valve body 14 defining a chamber 16 which receives a valve slider element 18. The valve slider element 18 is axially aligned with a pressurized fluid inlet 20 (FIG. 2) that is connected to a source of pressurized fuel (not shown). The valve body 14 has a cover 22 which is secured by bolts 24 thereto so as to close the chamber 16. The chamber 16 is sealed with respect to the valve body 14 by a resilient seal 26 so that fuel may be pressurized within the chamber.

The valve slider 18 divides the chamber 16 into a first portion 30 and second portion 32 which are interconnected because the inlet 20 (FIGS. 1–3) communicates with both chamber portions. The valve slider 18 is supported by first and second roller rail sets 34 and 36, wherein each roller rail set includes a first race 37 bolted by bolts 38 to the body 14 and a second race 39 bolted by bolts 40 to the valve slider 18. Roller bearings 41 are disposed between the racers 37 and 39. Compression on the first and second roller rails 34 and 36 is determined by adjusting bolts 45.

Figure 2:
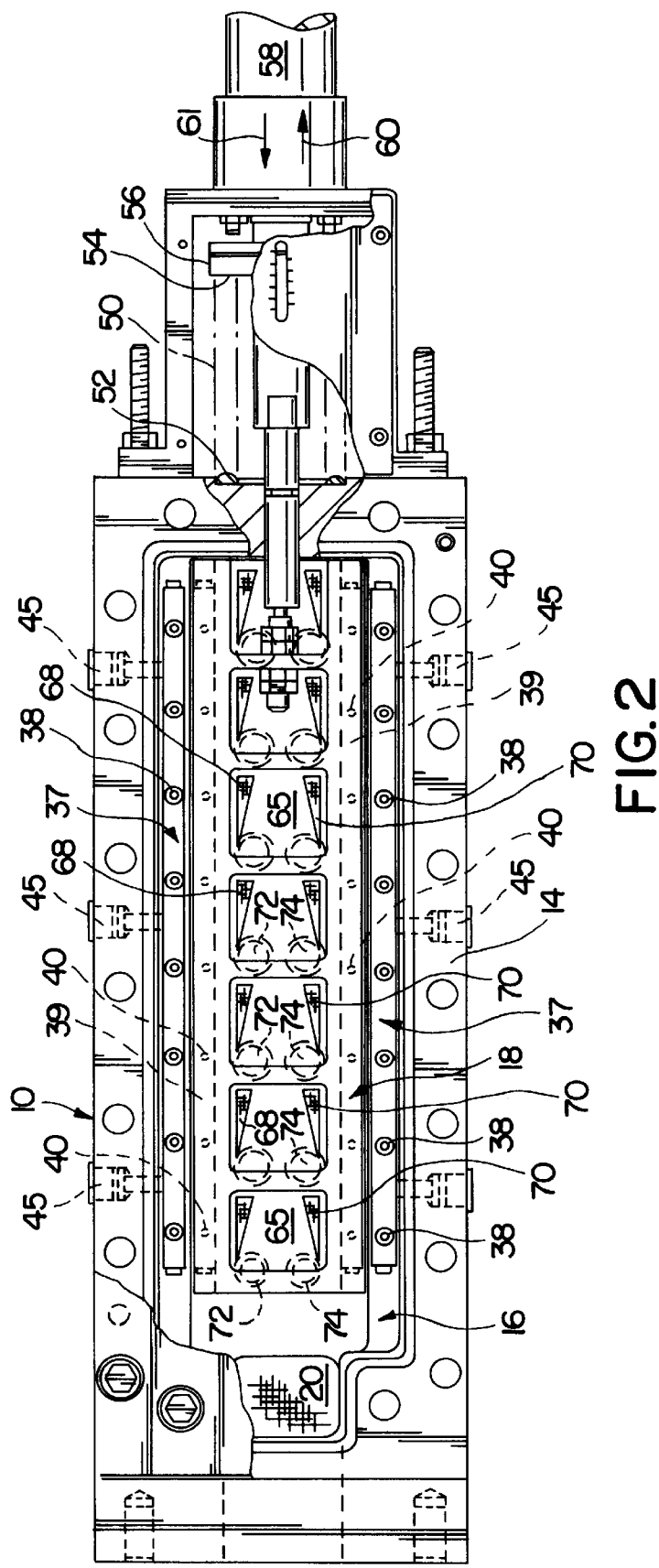
FIG. 2 is a top view of the multiport valve of FIG. 1 with a cover portion cut away.
Figure 4:
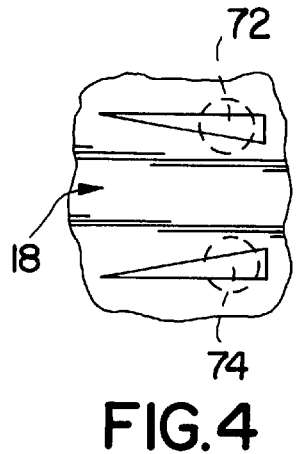
FIG. 4 is a view similar to FIG. 3, but showing the valve fully open.
Figure 3:
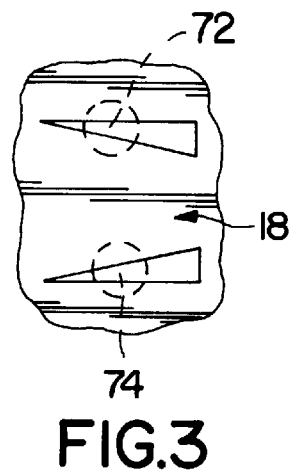
FIG. 3 is a view of a portion of the valve of FIG. 1, showing the multiport valve partially open.

As is seen in FIG. 2, the slider 18 is advanced against the bias of a coil spring 50 which has a first end 52 abutting the body 14 and a second end 54 which is seated in a cup 56 that is fixed to an axially slidable shaft 58. When the shaft 58 is moved in the direction of arrow 60 and compress the spring 50, the valve slider 18 also moves in the direction of arrow 60. When the shaft 58 is moved in the direction of arrow 61 under the bias of spring 50, the valve slider element 18 moves in the direction of arrow 61.

The valve slider 18 has a plurality of generally square wells 65 therein, each of which has a floor 66. In each well 65, there are two triangular apertures, 68 and 70, each of which converge in the direction of arrow 61 and widen in the direction of arrow 60. Aligned with the apertures 68 are a first row of first ports 72 and aligned with the apertures 70 are a second row of first ports 74. As the slider 18 moves in the direction of arrow 61, the areas of the triangular apertures 68 and 70 aligned with ports 72 and 74 widen, allowing more fuel to flow through the first ports 72 and 74. As the valve slider 18 moves in the direction of arrow 60, under the bias of spring 50, the areas of the portions of the triangular apertures 68 and 70 aligned with the first ports 72 and 74 decrease, therefore decreasing the amount of fuel flowing through the first ports 72 and 74 (see FIGS. 2–4). Since the triangular apertures 68 and 70 are each freed with respect to the slider 18 and are equally positioned with respect to the ports 72 and 74, the widening and narrowing of the aperture portions aligned with the first ports 72 and 74 occurs simultaneously so that a substantially equal amount of fuel is always delivered to each of the nozzles 12.

Figure 5:
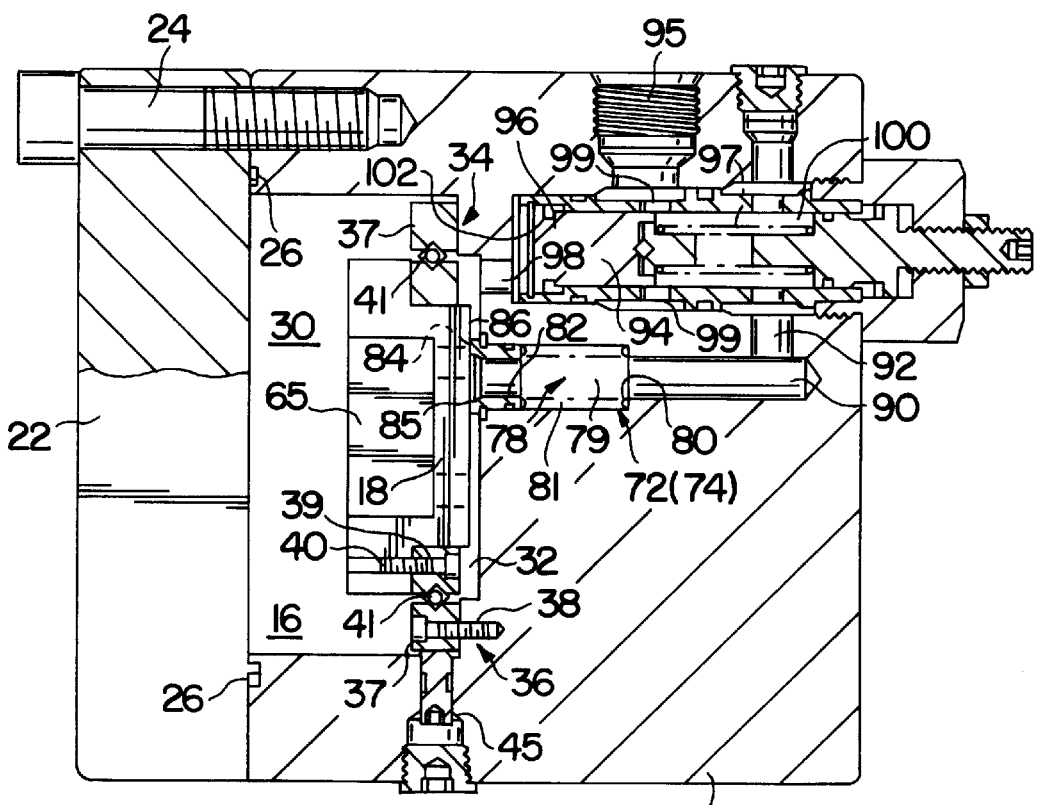
FIG. 5 is an elevation taken along lines 5—5 of FIG. 2.

As is seen in FIG. 5, each of the first ports 72 and 74 (only one outlet is shown in FIG. 5, but the first ports 72 and 74 are configured identically) is connected to a second connecting passage 78 which includes a wide passage portion 79 having a shoulder 80 against which a coil spring 81 bears. The coil spring 81 also bears against a sleeve 82 which has an end flange 84 having an end surface 85 that bears against the wall 86 of valve slider 18 so as to provide a seal between the valve slider and the ports 72 and 74 which ports serve as inlet ports for the second connecting passages 78.

In communication with the first passageway 79 of the outlets 72 and 74 is a second passageway 90, aligned therewith, the second passageway having a third laterally disposed passageway 92 which is in communication with a compensator valve 94. The compensator valve 94 communicates with an nozzle port 95 in the valve body 14 which is connected to the nozzles 12 (see FIG. 1). A piston 96 is disposed in the compensator valve 30 and is biased by a coil spring 97 toward a port 98 which provides a first connecting passage which connects a pressure chamber 102 with the second portion 32 of the chamber 16. Accordingly, fluid pressure is applied in the pressure chamber 102 to the piston 96 by pressurized fuel in the chamber 16 which urges the piston to close communication with the outlet 95 by covering ports 99. Opposing this, the combination of fuel pressure from the associated outlet 72 or 74 and the force of the coil spring 97 is sufficient to urge the piston 96 to open the ports 99 so that fuel will flow through the outlet passage 95 to the nozzle 12 connected thereto. When open, the ports 99 allow the interiors 100 of the compensator valves 94 to serve as passageways through the compensator valve.

By so configuring the flow control valves for fuel 10, pressure in the interior 100 of the compensators, compensate to maintain a constant differential pressure across the first ports 72 and 74. Thereby regulating flow.

By utilizing a sliding valve element 18, with the multiport proportional control valve 12 and by contacting the sliding valve element with the end face or shoe portion 85 of the spring biased sleeve 82, leakage between the sliding element and valve body is eliminated so that fuel only flows from the triangular apertures 68 and 70 through the outlets 72 and 74 and does not leak past the triangular apertures.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a flow control valve useful for supplying pressurized liquid to a gas turbine engine, the flow control valve being connected to a multiport injection system through an array of injection nozzles connected by more than two nozzle ports to the flow control valve, the improvement in the flow control valve comprising:

a main chamber in the flow control valve for receiving the pressurized fluid from a single inlet port;

a slidable valve element extending in an axial direction in the main chamber for controlling the volume of pressurized liquid flowing to the nozzle ports, the slidable valve element having a plurality of identical apertures one for each nozzle port therein wherein each aperture converges in the same direction and diverges in an opposite direction;

compensator valves disposed between the nozzle ports and the slidable valve element, the compensator valves each having a passageway therethrough opening to one of the nozzle valves and a pressure chamber, that pressure chamber applying pressure to close the passageway through the compensator valve;

a moveable member in each of the compensators, the moveable member being disposed between the pressure chamber and the passageway of each compensator and being biased toward the pressure chamber in a direction to widen the passageway;

a first connecting passage for each compensator, each first connecting passage connecting a pressure chamber to the main chamber; and a second connecting passage for each compensator, each second connecting passage connecting a passageway to the main chamber with the first connecting passages being always open and the second connecting passages being openable by alignment with the apertures in the slidable valve element.

2. The improvement of claim 1, wherein the second connecting passages connecting the passageways to the main chamber have inlet ports connected through the apertures in the slidable valve element which are in communication with the main chamber, the inlet ports being progressively opened by sliding the slidable valve element in a first direction and being progressively closed by sliding the slidable valve element in a second direction.

3. The improvement of claim 2, wherein the inlet ports each have a sleeve therein biased into engagement with the slidable valve element at a location alignable with one of the apertures.

4. The improvement of claim 3, wherein the sleeves have first and second ends, the first ends of the sleeves being engaged by springs seated in the inlet parts and the second ends of the sleeves being in metal-to-metal contact with the slidable valve element.

5. The improvement of claim 1, wherein the apertures are triangular.

6. The improvement of claim 1, wherein the slidable valve element is biased by a spring in one direction to close the inlet ports and wherein an operator, moveable against the bias of the spring, opens the inlet ports by moving in the opposite direction.

7. The improvement of claim 6, wherein the apertures are triangular and wherein the apertures each converge in the direction of the bias of the spring.

8. The improvement of claim 7, wherein the apertures are disposed in wells in the slidable valve element.

9. The improvement of claim 8, wherein there are two apertures in each well.

* * * * *